Nov. 5, 1957 W. E. HULL 2,811,966
ANIMAL RESPIRATORY MASK
Filed March 23, 1956 3 Sheets-Sheet 3

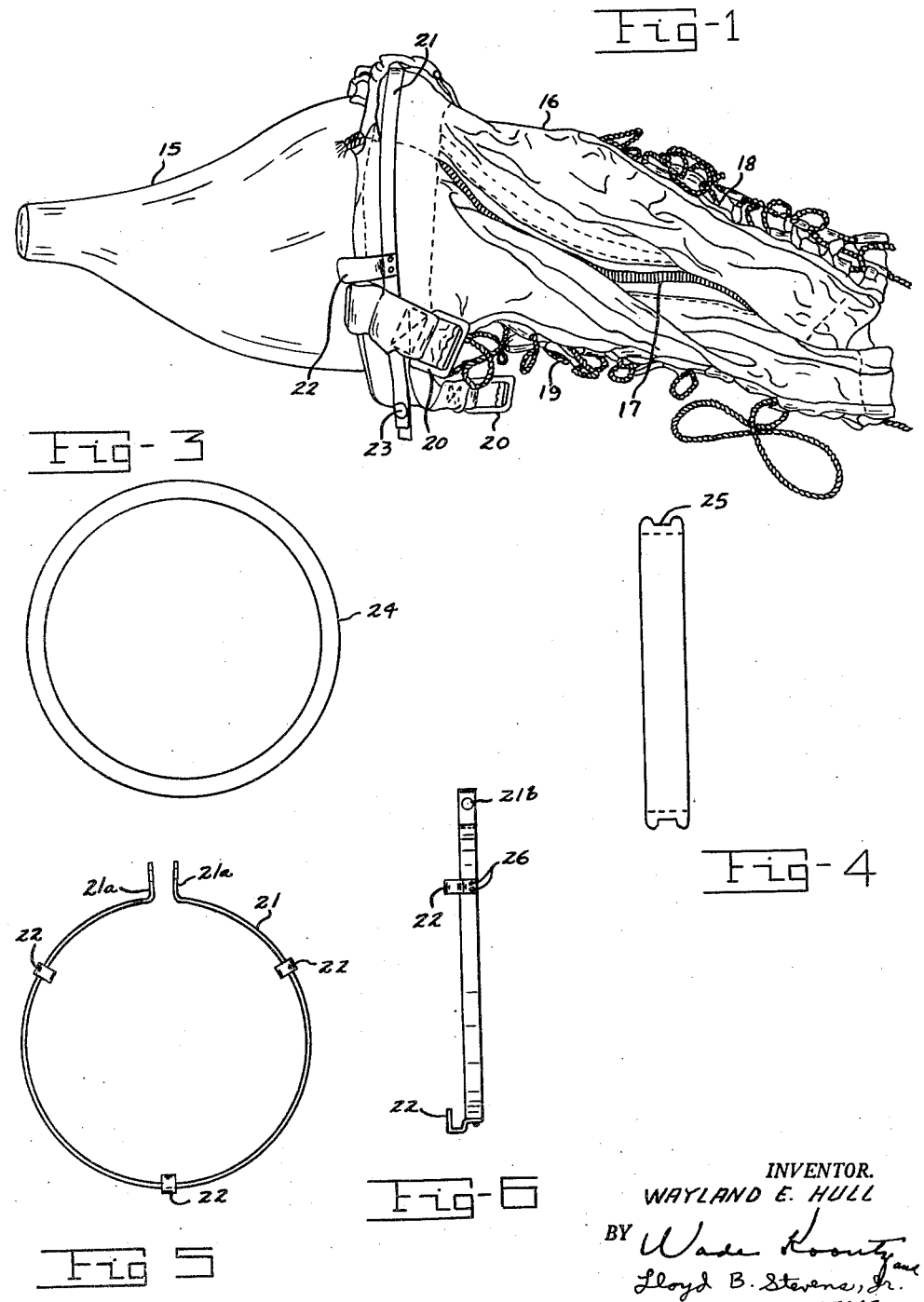

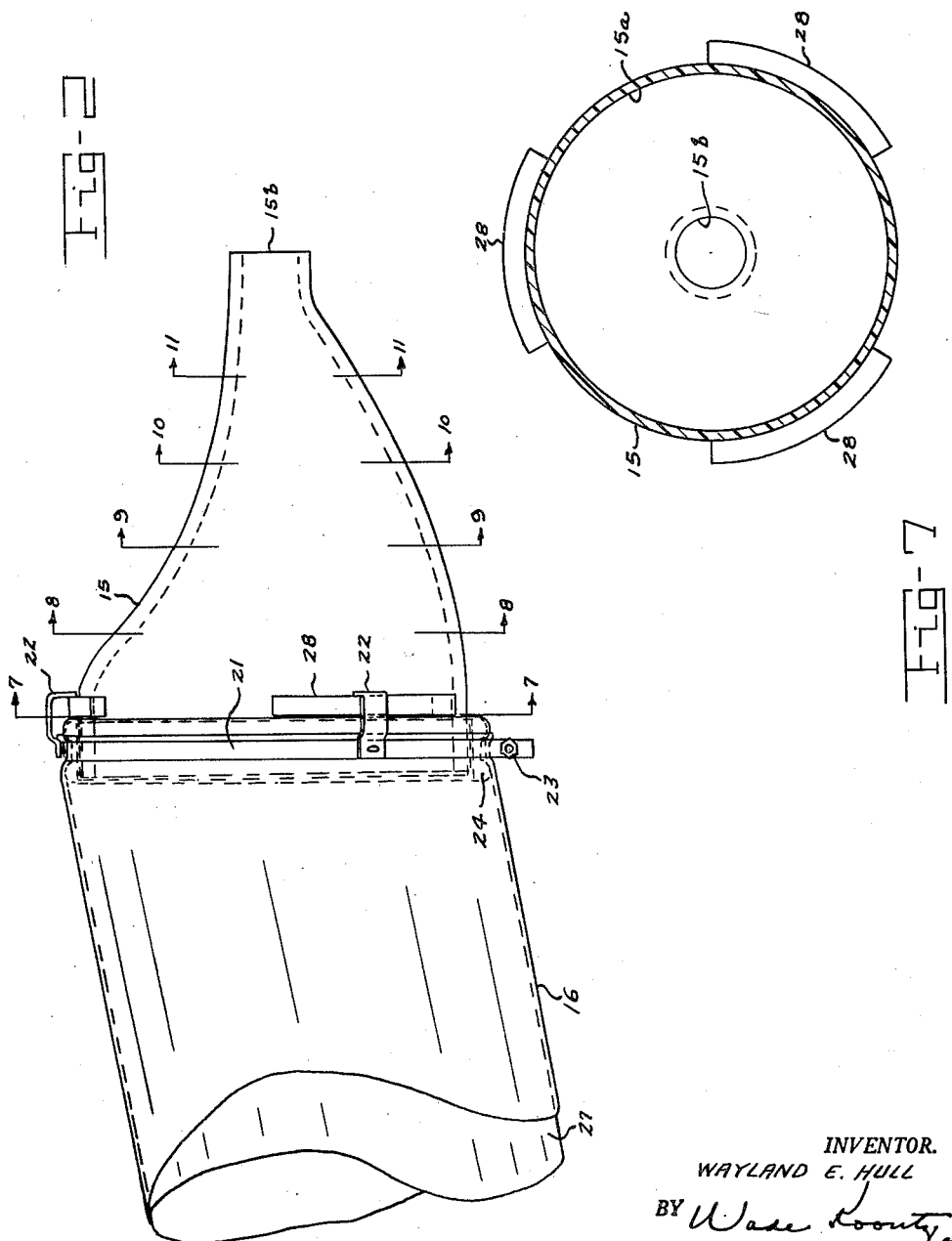

INVENTOR.
WAYLAND E. HULL
BY
ATTORNEYS

United States Patent Office 2,811,966
Patented Nov. 5, 1957

2,811,966

ANIMAL RESPIRATORY MASK

Wayland E. Hull, Durham, N. C., assignor to the United States of America as represented by the Secretary of the Air Force Application March 23, 1956, Serial No. 573,571

5 Claims. (Cl. 128—141)

(Granted under Title 35, U. S. Code (1952), sec. 266)

The invention described herein may be manufactured and used by or for the United States Government for governmental purposes without payment to me of any royalty thereon.

The invention relates to a respiratory mask for use on animals designed to be used either with respiratory apparatus such as oxygen breathing equipment or filtering equipment for the removal of injurious gases from the atmosphere. More particularly the invention relates to an oxygen breathing mask for a dog adapted for use with oxygen dispensing equipment.

Experimental animals have provided the only practical means of obtaining physiological data during the early stages of medical investigations where hazard of experimental procedures precludes the use of human subjects. For many years in the investigations of respiratory physiology involving experimental animals (usually the dog is selected as the experimental animal best suited for such work) the lack of an adequate oronasal or full-face mask for effecting a connection of gas dispensing equipment to the lungs of these animals has rather seriously interfered with satisfactory practice of experimentation.

There is a need for a suitable and satisfactory gas-dispensing mask for use on dogs which may be used during such experimental procedures and which will provide a means of gas-tight seal on the animal's head sufficient to permit the application and use of an intrapulmonic pressure higher than the pressure of the atmosphere which surrounds the animal. The very important studies of respiratory physiology in the Air Force and especially those studies associated with high-pressure breathing as required for the development of extremely high altitude personnel protective equipment has further justified the invention and development of a suitable animal mask.

Further, although the exact extent of the requirement is not known at this time, animals may be exposed during their work periods to concentrations of injurious gases which require their protection to permit them to complete their mission. The importance of protecting animals during attacks by an enemy using toxic gases and chemicals injurious to pulmonary functions is well known to the Armed Forces. The mask herein described is also proposed for this use if necessary.

It is an object of this invention to provide a respiratory mask for animals adapted for use with oxygen breathing equipment for the experimental testing of oxygen breathing equipment.

It is another object of this invention to provide a respiratory mask for animals adapted for use with filter equipment to protect the animals from injurious gases.

These and other objects of this invention will become apparent as the detailed description of the invention proceeds.

The above objects and other objects are accomplished by the invention which is a respiratory mask for animals. The facepiece of the mask is rigid and transparent so the animal can see through it and can be observed through the mask. A large opening is provided at one end of the mask so it can be installed on the head of the animal. A second opening is provided in the mask for the attachment of respiratory apparatus. A rigid collar is provided to fit over the outside of the facepiece adjacent the large opening so auxiliary equipment necessary to make the mask leak proof on the animal can be installed on the facepiece. Over this rigid collar an elastic sleeve is fitted and a portion of this sleeve extends toward the center of the collar to aid in forming the seal. The elastic sleeve is sized to be somewhat smaller than the neck of the animal on which it is to be installed so a tight seal will be formed between the neck of the animal and the sleeve. Over the collar and the elastic sleeve is fitted a flexible neckpiece which is provided with means to tighten the neckpiece around the neck of the animal to aid in maintaining the seal between the neck of the animal and the sleeve. Detachable means are provided to seal the neckpiece and the sleeve to the collar. Other detachable means are provided to hold the facepiece rigidly in position within the collar and a leakproof seal is formed by the elastic sleeve being stretched over the facepiece between the facepiece and the collar. Broadly speaking this describes the invention.

The invention will be more clearly understood from the following detailed description of a specific example thereof read in conjunction with the accompanying drawings wherein:

Fig. 1 is a perspective view of the entire apparatus in an assembled condition;

Fig. 2 is an elevational view of the apparatus in an assembled condition showing the relation of the various parts of the apparatus to each other in this condition;

Fig. 3 is a plan view of the rigid collar of the apparatus;

Fig. 4 is an elevational view of the rigid collar of the apparatus;

Fig. 5 is a plan view of the adjustable retaining ring of the apparatus;

Fig. 6 is an elevational view of the adjustable retaining ring;

Fig. 7 is a sectional view taken along the lines 7—7 of Fig. 2 wherein the showing of the clamps are omitted for clarity;

Figure 8:
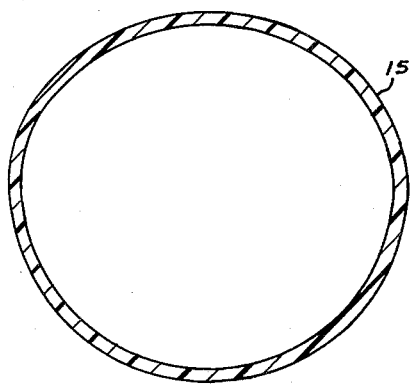
Fig. 8 is a sectional view of the facepiece taken along the lines 8—8 of Fig. 2.
Figure 11:
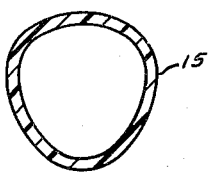
Fig. 11 is a sectional view of the facepiece taken along the lines 11—11 of Fig. 2.
Figure 9:
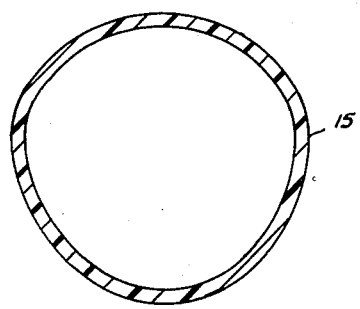
Fig. 9 is a sectional view of the facepiece taken along the lines 9—9 of Fig. 2.

The mask with all parts in assembled condition is shown in Fig. 1. Facepiece 15 of the mask is rigid in structure and made of a transparent plastic material. It is formed to the general contour of the head of the dog to reduce the void space within the mask when it is installed on the head of the dog. Neckpiece 16 is preferably made of inelastic fabric such as nylon. A zipper 17 is provided in the neckpiece running substantially the entire length of the neckpiece to facilitate the installation of the neckpiece on the dog. Two lacing panels 18 and 19 are provided in the neckpiece running substantially the entire length thereof to facilitate tightening the neckpiece when installed on the dog. Buckles and straps 20 are provided as a part of the detachable fastening means whereby the neckpiece can be attached to a retaining harness around the body of the dog below the shoulders to prevent the mask from moving forward on the dog's head. The adjustable retaining ring 21 is shown in place and one of the clamps 22 attached by rivets or other suitable means to the ring are shown. Normally bolt and nut 23 will be used to tighten the retaining ring in place.

In Figs. 3 and 4 is shown the rigid plastic collar 24 having a peripheral channel 25 therein.

Figs. 5 and 6 show the details of retaining ring 21. Three clamps 22 are shown rigidly attached by rivets 26 or other suitable means to the retaining ring. The retaining ring is a split ring having flanged portions 21a with openings 21b therein for the insertion of a bolt and nut or other suitable means to tighten the retaining ring.

The assembled mask is shown in Fig. 2 with dotted lines being used to show the relation of the parts in detail. Rubber sleeve 27 appears for the first time in this view. You will note by the dotted lines that this sleeve extends over collar 24 and between the collar and facepiece 15 being stretched over the facepiece to provide a seal at this point. Neckpiece 16 is not designed to extend between the facepiece and the collar as is the rubber sleeve. Fig. 7 shows the relationship of some of the parts of the facepiece. Bosses 28 of which there are three are particularly set forth showing their separation from midpoint to midpoint, one from another, by 120°. Clamps 22 in Fig. 5 are shown to have a similar separation to facilitate the locking of the clamps to the bosses. Opening 15a in the facepiece whereby the facepiece is installed over the head of the dog is circular in cross section. Likewise the opening 15b at the snout end of the facepiece is circular in cross section though of a much smaller cross section than the other opening.

Figs. 8, 9, 10 and 11 are cross sectional views taken at different points in Fig. 2 to all the varying shape and size of the facepiece at these different points on the facepiece.

Figure 12:
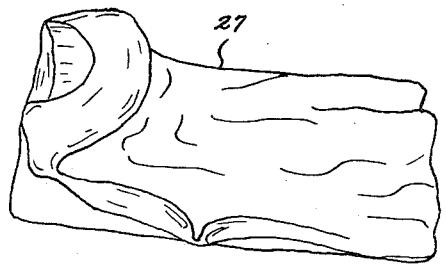
Fig. 12 is a perspective view of the rubber sleeve of the apparatus.
Figure 10:
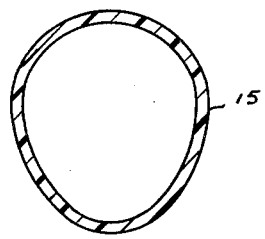
Fig. 10 is a sectional view of the facepiece taken along the lines 10—10 of Fig. 2.

Fig. 12 is a perspective view of rubber sleeve 27 showing the necking-down at the end designed to be slipped over the collar.

The facepiece, when it is in position, envelopes the nose, mouth and eyes of the dog. Into this facepiece respiratory gas can be introduced through the opening located near the animal's nares, i. e., the snout end of the facepiece. Thus the eyes of the animal are clearly visible through the plastic facepiece. Valves and other appurtenances can be affixed to the facepiece or can be a part of the auxiliary breathing apparatus to which the mask attaches.

The rubber sleeve or neck-seal gasket provides the seal around the neck of the animal on the proximal or neck end. The rubber sleeve is fabricated to fit over the rigid plastic collar and project into the circle of the collar for a short distance. The seal on the facepiece end of the rubber piece is effected to the collar by the clamping attachment of the retaining ring. The distal, or neck end of the rubber sleeve lies over the neck of the animal.

The fabric neckpiece is preferably constructed of inelastic fabric such as nylon and it is constructed to fit tightly over the plastic collar on the mask end. A zipper runs nearly the full length of the fabric piece to facilitate the installation on the neck of the dog. In addition to the zipper opening the fabric neckpiece has two lacing panels lying along the neck of the animal 180° apart from one another. These lacing panels permit accurate fitting of the fabric neckpiece to various neck sizes.

The fitting of the mask on the dog is described below. The rubber sleeve is placed onto the plastic collar. Next the fabric neckpiece is placed over the rubber sleeve on the collar, and the metal retaining ring is placed and tightened over these components in the collar channel so as to clamp the neckpiece and sleeve tightly to the plastic ring. The zipper of the neckpiece is unfastened exposing the rubber sleeve. The rubber sleeve is then pulled over the head of the dog to completely cover the neck of the animal. The plastic collar will then lie slightly behind the eyes of the animal. The distal end (toward the animal's shoulders) of the rubber sleeve is turned under to form a reflected fold lying against the animal's neck for a distance of a few inches. The fabric piece is zippered closed and a snug fit of the sleeve and the fabric neckpiece is accomplished by careful lacing of the lacing panel. Having effected a snug but comfortable fit on the animal's neck the loose ends of the laces are tied with a bow knot.

The next step in assembling the mask is the placement of the plastic facepiece. The plastic facepiece is placed over the snout of the dog and inserted into the plastic collar. Since the rubber sleeve reflects into the collar for about an inch the insertion of the facepiece will further reflect the end of the rubber sleeve until the rubber sleeve lies between the collar and the facepiece. The facepiece is then rotated a few degrees to bring the metal clamps of the retaining ring behind the bosses on the facepiece. The facepiece is now secured in the collar and is leak-tight against internally applied pressures, the reflected end of the rubber sleeve under the fabric neckpiece forming the seal. With increase in internal pressure the rubber sleeve presses against the facepiece, the higher the pressure the greater the sealing pressure and the better the seal. The rubber seal cannot blow out nor can the facepiece separate from the retaining ring. The facepiece can be removed instantly by rotating the facepiece to disengage the clamps from behind the bosses thereby permitting the facepiece to move forward and out of the collar.

The pressure seal of the rubber sleeve against the neck of the animal at the distal end of the mask assembly is effected in like manner. Increase in pressure within the mask tends to inflate the reflected end of the rubber piece. The higher the internal pressure the greater the seal. Blow-out of the seal is prevented by careful adjustment and fitting of the inelastic fabric neckpiece.

Internal pressure in the mask tends to cause the mask to move forward on the head of the animal. Straps and buckles are provided on the neckpiece which can be attached to a suitable restraining harness placed on the body of the animal behind his shoulders. Forward movement of the mask is prevented and the position of the neckpiece is stabilized.

The mask assembly is light in weight and is comfortable on the animal. Continuous wear will not damage the animal in any way. No surgical procedures are required and the placement and fitting of the mask is entirely painless.

The respiratory mask which is this invention may be applied to a great variety of animals for their protection from toxic gas and chemicals and for the implementation of medical research where experimental animals are used in the place of humans. This mask has a number of important features and advantages, some of which have been discussed above. It is highly effective in providing a convenient full-head respiratory mask device and this mask can be used with mask pressures as high as 90 mm. Hg without leakage. Shaving of the hair from the neck of the animal is usually not necessary. This mask is applied to the animal and fitted and used without causing the animal undue discomfort or inconvenience. The plastic facepiece provides a means of observing the face of the animal as well as providing the animal his own convenience of vision. These features reduce apprehension to a marked degree. The mask is placed onto the animal and removed with ease. The components of the mask are inexpensively constructed and the mask may be disassembled in a matter of a few minutes for replacement of components or for cleaning. All components may be washed or sterilized without harm to them. The removable features of the facepiece provide a most convenient means of access to the mouth, nose and eyes of the animal. The seal against high internal pressure is extremely effective and provides a heretofore unattainable convenience to the medical researcher in the field of pressure breathing. The "demand breathing" seal is effective within the range of physiologically sound negative pressures. A greater variety of respiratory valves may be placed on or in the facepiece. The facepiece is readily connected to conventional respiratory apparatus. The mask does not interfere with normal movements of the head or neck of the animal.

Although the invention has been described in terms of specific apparatus which is set forth in considerable detail it should be understood that this is by way of illustration only and that the invention is not necessarily limited thereto since alternative embodiments or operating techniques will become apparent to those skilled in the art in view of the disclosure. Accordingly, modifications are contemplated which can be made without departing from the spirit of the described invention or of the scope of the appended claims.

What is claimed is:

1. A respiratory mask for an animal comprising a rigid transparent facepiece formed to the general contour of the head of the animal, said facepiece having at one end thereof a first opening larger than the animal's head so the facepiece can be installed on the head of the animal, said facepiece having a second opening for the attachment of a respiratory apparatus; a rigid collar fitted over the outside of said facepiece adjacent the first opening; an elastic sleeve fitting over said collar extending towards the center thereof and sized to fit by stretching in a tight seal around the neck of the animal; a flexible neckpiece fitting over said collar and said sleeve, means for tightening said neckpiece around the neck of the animal to aid in maintaining the seal between the neck of the animal and said sleeve; a first detachable means for sealing said neckpiece and said sleeve to said collar; and a second detachable means for holding said facepiece rigidly positioned within said collar, a leakproof seal being formed by said elastic sleeve being stretched over said facepiece between said facepiece and said collar.

2. The mask of claim 1 wherein said detachable means for holding said facepiece rigidly positioned within said collar comprises bosses on said facepiece, and clamps attached to a retaining ring which clamps are engageable with said bosses and hold the sleeve-covered collar against said bosses.

3. The mask of claim 1 wherein said flexible neckpiece has a zipper therein to facilitate the installation of the neckpiece on the animal, and lacing panel means in said neckpiece are the means to tighten said neckpiece around the neck of the animal.

4. An oxygen breathing mask for a dog comprising a rigid, transparent plastic facepiece formed to the general contour of the head of the dog, said facepiece having at one end thereof a first opening larger than the dog's head so the facepiece can be installed on the head of the dog, said facepiece having a second opening in the other end of the facepiece for the attachment of oxygen breathing apparatus, three bosses formed on the outside surface of said facepiece near the first opening therein, said bosses being about equidistant one from the other and being positioned circumferentially on said facepiece; a rigid plastic collar having a peripheral channel and fitting over the outside of said facepiece adjacent the first opening; a rubber sleeve fitting over said collar extending towards the center thereof and sized to fit by stretching in a tight seal around the neck of the dog; a fabric neckpiece fitting over said collar and said sleeve, a zipper as a part of said neckpiece to facilitate the installation of the neckpiece on the dog, lacing panel means in said neckpiece allowing said neckpiece to be tightened around the neck of the animal; and an adjustable retaining ring positioned in the channel of said collar over said neckpiece and said sleeve, means to tighten said ring to seal said sleeve and said neckpiece to said collar, three clamps rigidly attached to said ring and positioned circumferentially on said ring about equidistant from one another, said clamps being engageable with said bosses to hold the sleeve-covered collar against said bosses and forming a joint wherein said rubber sleeve is stretched over said facepiece between said facepiece and said collar to form a leakproof seal.

5. The mask of claim 4 wherein detachable fastening means are rigidly attached to said neckpiece, said fastening means being attachable to a restraining harness which can be placed on the body of the dog behind its shoulders to prevent the mask from moving forward on the head of the dog.

References Cited in the file of this patent

FOREIGN PATENTS

| | | |
|---|---|---|
| 531,805 | Great Britain | Jan. 10, 1941 |
| 859,106 | France | May 27, 1940 |
| 862,226 | France | Nov. 30, 1940 |
| 863,791 | France | Jan. 6, 1941 |